Aug. 4, 1959   A. S. ENSLER ET AL   2,898,213
MULTIPLE UNITARY FROZEN CONFECTION
Filed Oct. 23, 1956   2 Sheets-Sheet 1
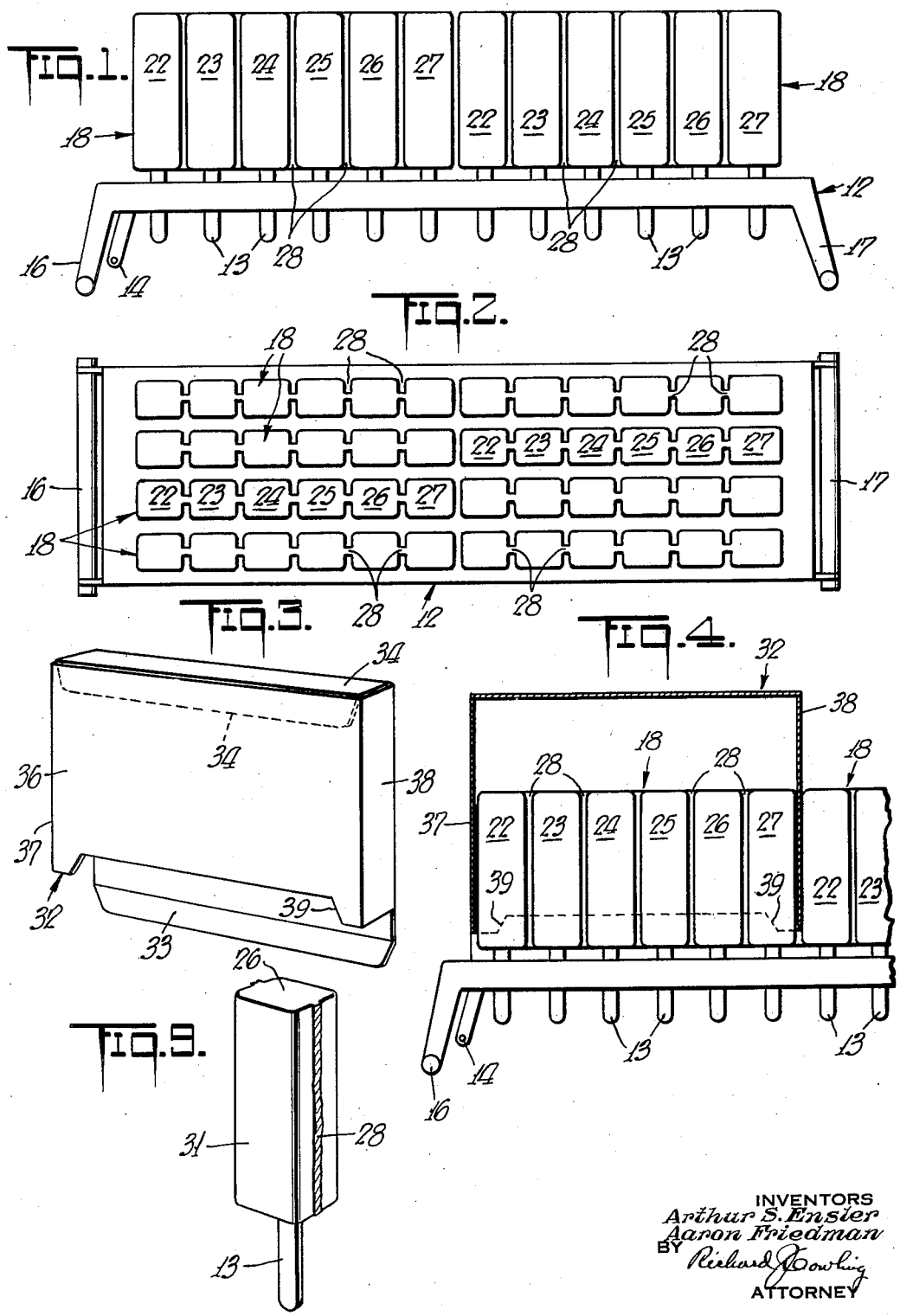
INVENTORS
*Arthur S. Ensler*
*Aaron Friedman*
BY
*Richard J. Cowling*
ATTORNEY Aug. 4, 1959  A. S. ENSLER ET AL  2,898,213
MULTIPLE UNITARY FROZEN CONFECTION
Filed Oct. 23, 1956  2 Sheets-Sheet 2
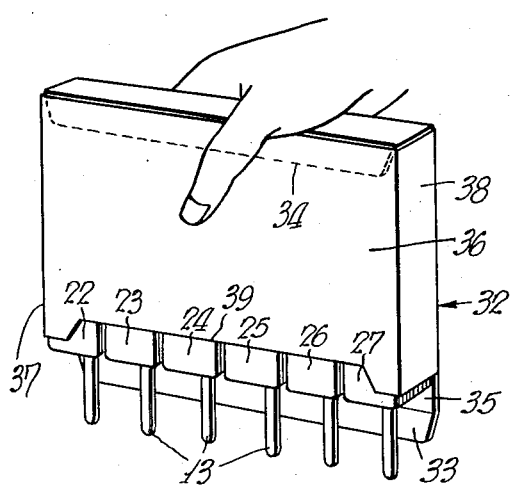
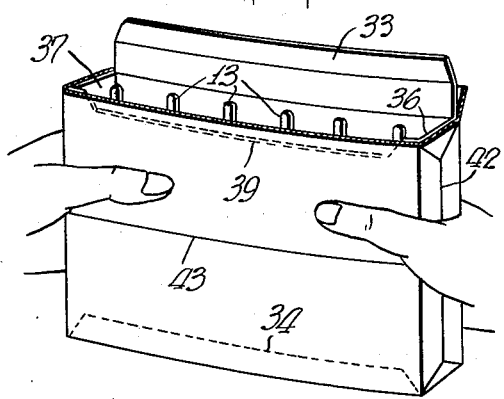
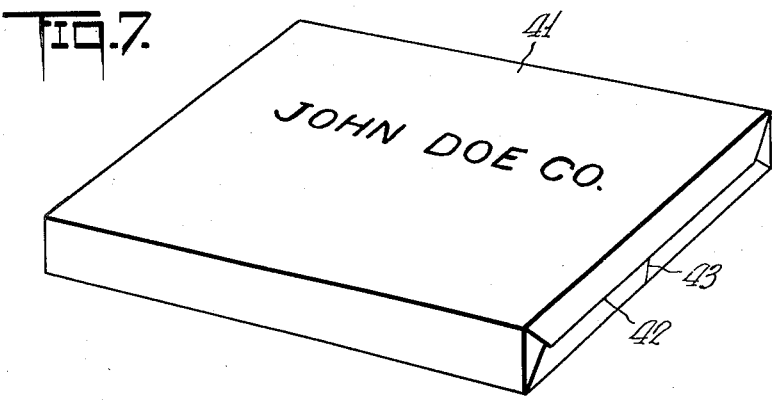
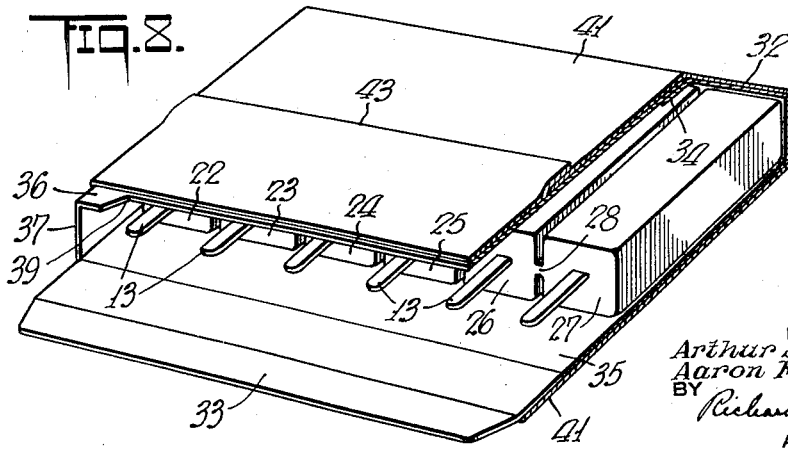
INVENTORS
*Arthur S. Ensler*
*Aaron Friedman*
BY
*Richard Newlin*
ATTORNEY United States Patent Office 2,898,213
Patented Aug. 4, 1959

2,898,213

MULTIPLE UNITARY FROZEN CONFECTION

Arthur S. Ensler, Scarsdale, and Aaron Friedman, New York, N.Y., assignors to Joe Lowe Corporation, New York, N.Y., a corporation of Delaware Application October 23, 1956, Serial No. 617,751

2 Claims. (Cl. 99—180)

The present invention relates generally to frozen confections on sticks and a method of packaging the same, and it has particular relation to improvements in such frozen confections and the method of manufacturing and packaging the same whereby a plurality of such confections may be made as a single multiple unit that is especially adapted for distribution and sale in chain stores or super-markets from conventional open-top retail refrigerated cabinets along with other types of frozen foods.

Heretofore, frozen confections on sticks have been made and sold only as an individual confection, having either one or two handle sticks, packaged in a single wrapper or bag made of foil, cellophane and/or waxed paper. While it was possible to separate the double stick confection into two individual confections, their construction was such that special breaking or cutting equipment was required and the separated confections did not retain an esthetic design, having one distorted and irregular side surface. A plurality of such single confections could not be manufactured, wrapped and boxed in cartons to provide a multiple package economically and efficiently for the chain store or super market trade, which requires a lower price than other stores. Furthermore, while a number of such individual confections could be packaged or boxed for retail sale as a unit, the package was too large and not of the size and shape required by such stores for efficient handling, stacking and merchandizing along with their other packaged frozen food products.

The present invention has for an object to provide a multiple unitary package of frozen confections on sticks designed especially for the efficiency and economy of the chain store or super market trade.

Another object of the invention is the provision of a method of manufacturing and packaging a plurality of frozen confections, each having its own individual handle stick, in a unit that may be handled with the ease and convenience of a single confection.

A further object of the invention is to provide a unitary multiple frozen confection package that is relatively thin and flat, corresponding in size and shape to standard frozen food packages, whereby they can be easily and conveniently stacked and packed in rows in conventional open-top retail refrigerated cabinets along with other frozen food packages.

Another object of the invention is the provision of a novel and unitary frozen confection package in which the manufacture of the frozen confection unit may utilize much of the existing equipment now available in the industry for the manufacture of the individual confections, such as for example, brine tanks, machines for inserting sticks in stickholders, stickholders, defrosters and the like.

A further object of the invention is to provide a novel and efficient multiple frozen confection unit that lends itself to economical and efficient packaging within a cost price range far below the wrapping and packaging of a corresponding number of individual confections.

Another object of the invention is the provision of a single multiple confection unit that is readily adaptable to easy separation by the purchaser into fragments, whereby each fragment becomes a single confection on a stick of an attractive and eye-appealing design.

A further object of the invention is to provide a multiple unitary frozen confection package that permits the unitary multiple frozen confection to be broken into fragments by the purchaser, usually a housewife, whereby each fragment becames an individual confection on a stick, without requiring the removal and handling of the entire unit from its original package.

Another object of the invention is the provision of an attractively designed unitary multiple frozen confection that may be broken into fragments without the aid of tools of any kind, forming individual confections on sticks having an attractive and eye-appealing design.

A further object of the invention is to provide a multiple unitary frozen confection that utilizes the same process of manufacture up to the packaging step as the conventional single or double stick confections, whereby no change in the steps of the process or rearrangement of the plant or equipment is required, and the finished unitary confections may be produced interchangeably with standard confections.

Other and further objects and advantages of the invention reside in the unitary multiple confection and the method of packaging the same, which result in simplicity, economy and efficiency, and which will be apparent from the following description, wherein a preferred embodiment of the invention is shown, reference being had to the accompanying drawings, forming a part hereof, wherein like numerals indicate like parts, in which:

Figure 1 is a side elevational view of a conventional stickholder having a plurality of unitary multiple confections secured releasably therein by their respective handle sticks, the same being shown in its inverted position as compared to its normal position wherein the confections are pendant;

Figure 2 is a top plan view of the stickholder and the multiple unitary confections shown in Figure 1;

Figure 3 is a perspective view of a carton or interliner of the type used to package the multiple unitary confection, the same being shown with its top end flap in its closed position and its bottom end flap extended in its open position, which permits the carton or interliner to be slipped over the top end of the confection unit while the same is still being held in the stickholder as depicted in Figure 1;

Figure 4 is a fragmentary side elevational view of the stickholder and confection units shown in Figure 1, with the carton or interliner of Figure 3 being shown in its final position over one of the unitary multiple confections mounted in said stickholder;

Figure 5 is a view illustrating the manner in which a packaged multiple confection is removed manually from its stickholder after the handle sticks have been released therefrom;

Figure 6 is a view, illustrating how the unitary confection may be easily and conveniently broken into fragments of individual confections by flexing the package between the hands without removing the frozen confection unit from its package;

Figure 7 is a view showing the closed box or interliner of Figure 6 sealed within a colored cellophane or waxed paper overwrap, which has its opposite ends and side edges sealed in any suitable manner;

Figure 8 is a fragmentary view illustrating the manner in which the frozen confection unit may be fitted into a thin flat package, and having one end section broken away to better show the packaging arrangement; and Figure 9 is a perspective view of a fragmentary piece of the unitary multiple frozen confection after it has been separated from the main unit, showing said fragment as a complete frozen stick confection.

Referring now to the drawings and particularly to Figure 1 thereof, there is shown a conventional stickholder 12, having forty-eight sticks 13 arranged in four transversely spaced longitudinal rows of twelve sticks each. The projecting ends of the sticks of these confections are locked releasably in a fixed position in said stickholder by means of mechanism manipulated by the pivotal handle 14.

The stickholder 12 is shown in an inverted position with respect of its normal position in use. When the stickholder 12 is positioned normally over a conventional mold, its pendant sticks 13 project downwardly into the cavities of said mold and its carrying handles 16 and 17 project upwardly to facilitate grasping by the hands.

Referring now to Figure 2, it will be noted that each of the multiple frozen confection units 18 contains six handle sticks 13, and each forms exactly one-half of a longitudinal row in the stickholder 12. It will be appreciated that eight multiple frozen confection units can be produced during each mold freezing operation.

It will be apparent in Figure 2 that each multiple unitary frozen confection 18 consists of six distinctively shaped portions 22, 23, 24, 25, 26 and 27. It will also be apparent that each of the multiple unitary frozen confections 18 is of a substantial length as compared to its height, is of a substantial height as compared to the thickness of its distinctively shaped portions and that each of the distinctively shaped portions is of a substantial thickness as compared to the relatively thin and flat thickness of the web formations.

Each of the distinctively shaped portions 22, 23, 24, 25, 26 and 27 of each multiple confection unit 18 is connected longitudinally to its next adjacent portion by a relatively thin and flat web formation 28, which extends substantially the length of the distinctively shaped portions in a plane parallel to their major longitudinal axes. It will be noted that the distinctively shaped portions 22, 23, 24, 25, 26 and 27 and their connecting web formations 28 are arranged symmetrically of the longitudinal axis of the unitary frozen confection 18. Such web connecting formations 28 are readily frangible under pressure, which may be exerted in a flexing manner through the sides of the package, as best illustrated in Figure 6. By the purchasers being able to open the flap 33 on one end of the package 32, they are able to distinguish each of the distinctively shaped portions and apply their flexing pressure directly over the web formation 28 desired to be broken.

The eight unitary multiple confection units 18 secured in an inverted position in the stickholder 12 are now ready to be packaged. A most convenient method is to slide the open-ended tubular carton or interliner 32, having dimensions slightly larger than the confectionery unit it is designed to receive, over each multiple confection unit 18 while it is still held in the stickholder 12 by its handle sticks 13. The tubular carton or interliner 32 is made preferably of a form-retaining paper board, which is treated or coated with any suitable material to make it water repellant and non-tacky to the frozen confection surfaces. The carton has a front panel 35, a back panel 36, and two side panels 37 and 38, the front panel 35 being provided with double hinged end closure flaps 33 and 34. The back panel 36 has a cut-out portion 39 adjacent its bottom edge to facilitate inspection of the confectionery unit 18 therein when said flap 33 is opened.

These tubular cartons or interliners 32 are collapsible into a flat position for shipping and storage. They may be readily set up for receiving the multiple frozen confection unit 18 by merely pressing inwardly on the sides 37 and 38, which causes the same to assume a tubular shape with its opposite hinged end flaps 33 and 34 extended. The top end flap 34 is now ready to be inserted under the back panel 36 for closing said end, as best shown in Figure 3. With its bottom end flap 33 still open and extended, the carton 32 is slipped over an upstanding multiple frozen confection unit 18 until the top of said unit touches the closed end flap 34. The packer is now ready to squeeze the front panel 35 and back panel 36 tightly between his thumb and forefinger, as best illustrated in Figure 5, and by pinching the panels 35 and 36 together frictionally engage the confectionary unit 18, permitting its removal with the carton 32 from the stickholder 12, whose sticks 13 have been previously released by manipulation of the handle 14. The packer then closes the open bottom flap 33 over the projecting ends of the handle sticks 13 without inserting the same under the back panel 36 of the carton 32. It has been found that a stronger and more form-retaining package results when the bottom end flap 33 is not inserted under the back panel 36 of the carton 32, but is super-imposed over the cut-out portion 39. This arrangement also facilitates opening the sealed carton as it permits a knife-blade (not shown) to be inserted under the flap 33 and between it and the back panel 36, which serve to form a guideway for said slitting knife blade.

The closed carton 32 is then fed into a conventional wrapping machine (not shown), which wraps the same with an attractively colored and highly decorated over-wrap 41, which has its ends 42 and side edges 43 sealed in any suitable manner. The sealed and finished package is shown in Figure 7, and it is of a size and shape convenient for shipping and stacking in an efficient and satisfactory manner in conventional refrigerated storage cabinets of a standard chain store or super-market. It is to be understood, however, that the shape or construction of the package may be varied without departing from the spirit of the present invention.

These sealed packages, because of the large amount of material in the frozen confectionary units 18, which result in a greatly increased amount of latent refrigeration in the same, may be selected from the refrigerated cabinet in a chain store or super-market, carried home without refrigeration, and then stored in the freezing compartment of the standard household refrigerator until desired.

When it is desired to dispense one or more of the distinctively shaped portions 22, 23, 24, 25, 26 and 27 of a multiple confectionery unit 18, its sealed package is removed from said freezing compartment. A knife blade is inserted through the colored overwrap 41 and under the flap 33, which forms a guideway with said back panel 36 for the knife blade, and the overwrap 41 is slit or cut the length of the carton or package. The end flap 33 may now be opened, exposing to view the sticks of the unit 18 and the frangible web connecting formations 28 thereof. Knowing the exact position of each of the web connecting formations 28, the flexing pressure may be applied at the proper places on the sides of the package to most advantageously break said formations for removal of the desired fragmentary portion or portions therefrom.

Each fragmentary portion 31 becomes an individual confection, having its own handle stick. The unsightly rough edges of the web formations 28, being relatively thin and flat, melt rapidly away when exposed to room temperatures, thereby removing the same from the surface or surfaces of the individual fragmentary portions 31. Manifestly, under such circumstances, they form no serious objection to the esthetic features of the final confectionery fragment.

It will be obvious that by repeating the flexing operation on the sides 35 and 36 of the carton or sealed package, each of the distinctively shaped formations 22, 23, 24, 25, 26 and 27 may be separated to provide an attractively shaped frozen confection 31, having its own individual handle stick 13 for convenience in eating.

Although we have only described in detail one embodiment of the invention, it will be apparent to those skilled in the art that many further modifications may be made therein without departing from the spirit thereof or from the scope of the appended claims.

What we claim is:

1. A package including a frozen confection of a substantial length as compared to its height having a plurality of distinctively shaped portions of a substantial height as compared to their thickness connected by a plurality of spaced web formations which are relatively thin and flat as compared to the thickness of the distinctively shaped portions, each distinctively shaped portion having a handle stick projecting outwardly therefrom, whereby an individual by flexing said package can break said web formations and remove said separated distinctively shaped portions each by its own handle stick as a complete frozen confection on a stick.

2. A closed and sealed package including a frozen confection of a substantial length as compared to its height having a plurality of distinctively shaped portions of a substantial height as compared to their thickness connected by a plurality of spaced web formations which are relatively thin and flat as compared to the thickness of the distinctively shaped portions, each web formation extending substantially the entire length of the distinctively shaped portions and arranged in a vertical plane, each distinctively shaped portion having a handle stick projecting outwardly from its lower end, and each of said web formations being frangible under flexing pressures on said package, whereby each distinctively shaped portion forms a complete frozen confection having a stick projecting therefrom by which it may be removed from the package when the latter is opened.

References Cited in the file of this patent
UNITED STATES PATENTS

| | | |
|---|---|---|
| D. 92,987 | Thomas | Aug. 7, 1934 |
| D. 137,301 | Williams | Feb. 15, 1944 |
| 1,470,524 | Burt | Oct. 9, 1923 |
| 2,320,985 | Overland | June 1, 1943 |
| 2,500,006 | Overland | Mar. 7, 1950 |